US012354299B2

(12) United States Patent
Xia et al.

(10) Patent No.: US 12,354,299 B2
(45) Date of Patent: Jul. 8, 2025

(54) THROWING POSITION ACQUISITION METHOD AND APPARATUS, COMPUTER DEVICE AND STORAGE MEDIUM

(71) Applicant: TENCENT TECHNOLOGY (SHENZHEN) COMPANY LIMITED, Guangdong (CN)

(72) Inventors: Maocai Xia, Guangdong (CN); Si jia Tu, Guangdong (CN); Shuisheng Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 497 days.

(21) Appl. No.: 17/945,573

(22) Filed: Sep. 15, 2022

(65) Prior Publication Data

US 2023/0005176 A1 Jan. 5, 2023

Related U.S. Application Data

(63) Continuation of application No. PCT/CN2021/120197, filed on Sep. 24, 2021.

(30) Foreign Application Priority Data

Oct. 16, 2020 (CN) .......................... 202011110807.2

(51) Int. Cl.
*G06K 9/00* (2022.01)
*G06T 7/60* (2017.01)
(Continued)

(52) U.S. Cl.
CPC ................... *G06T 7/70* (2017.01); *G06T 7/60* (2013.01); *G06T 2207/10016* (2013.01);
(Continued)

(58) Field of Classification Search
CPC ... G06T 7/70; G06T 7/60; G06T 2207/10016; G06T 2207/30232; G06T 2207/30241; G08B 21/02
See application file for complete search history.

(56) References Cited

U.S. PATENT DOCUMENTS 6,073,086 A * 6/2000 Marinelli ............... A63B 43/00
473/200
8,107,680 B2 * 1/2012 Henson ............ G08B 13/19608
382/103
(Continued)

FOREIGN PATENT DOCUMENTS

CN 109163667 A 1/2019
CN 109309811 A * 2/2019 ............. H04N 5/144
(Continued)

OTHER PUBLICATIONS

Chinese Office Action for 202011110807.2 dated Jun. 23, 2022.
(Continued)

*Primary Examiner* — Avinash Yentrapati
(74) *Attorney, Agent, or Firm* — Sughrue Mion, PLLC

(57) ABSTRACT

A throwing position acquisition method and apparatus, a computer device, and a storage medium. The method includes: acquiring image frames of a target video; acquiring a projectile position in each image frame; acquiring a trajectory starting point position of the target object based on the projectile position in each image frame; acquiring, based on projectile positions corresponding to at least one group of image frames in the image frames, a first height value corresponding to a case that the target object is thrown; and acquiring a throwing position of the target object based on the first height value and the trajectory starting point position of the target object.

20 Claims, 7 Drawing Sheets

(51) Int. Cl.
*G06T 7/70* (2017.01)
*G08B 21/02* (2006.01)

(52) U.S. Cl.
CPC ............. *G06T 2207/30232* (2013.01); *G06T 2207/30241* (2013.01); *G08B 21/02* (2013.01)

(56) References Cited

U.S. PATENT DOCUMENTS

| | | | | |
|---|---|---|---|---|
| 10,582,008 | B2* | 3/2020 | Richard | H04L 67/306 |
| 2005/0123172 | A1* | 6/2005 | Henson | G08B 13/19686 |
| | | | | 382/103 |
| 2009/0046147 | A1* | 2/2009 | Henson | H04N 7/181 |
| | | | | 348/143 |
| 2017/0083790 | A1* | 3/2017 | Risinger | G06T 7/254 |
| 2020/0134863 | A1* | 4/2020 | Jin | G06T 7/246 |
| 2021/0113924 | A1* | 4/2021 | Liu | A63F 13/2145 |
| 2021/0287379 | A1* | 9/2021 | Zheng | G06T 7/246 |
| 2021/0316222 | A1* | 10/2021 | Li | A63F 13/573 |

FOREIGN PATENT DOCUMENTS

| | | | | |
|---|---|---|---|---|
| CN | 110675418 | A | | 1/2020 |
| CN | 111079663 | A | | 4/2020 |
| CN | 111553274 | A | * 8/2020 | ............ H04N 5/144 |
| CN | 111669551 | A | | 9/2020 |
| CN | 111768431 | A | | 10/2020 |
| CN | 112258573 | A | | 1/2021 |

OTHER PUBLICATIONS

International Search Report for PCT/CN2021/120197 dated, Dec. 6, 2021 (PCT/ISA/210).
Written Opinion of the International Searching Authority for PCT/CN2021/120197 dated, Dec. 6, 2021 (PCT/ISA/237).

* cited by examiner

THROWING POSITION ACQUISITION METHOD AND APPARATUS, COMPUTER DEVICE AND STORAGE MEDIUM

CROSS-REFERENCE TO RELATED APPLICATION(S)

This application is a continuation application of International Application No. PCT/CN2021/120197, filed on Sep. 24, 2021, which claims priority to Chinese Patent Application No. 202011110807.2, filed with the China National Intellectual Property Administration on Oct. 16, 2020, the disclosures of which are incorporated by reference in their entireties.

FIELD

The present disclosure relates to the field of image processing, and in particular, to a throwing position acquisition method and apparatus, a computer device, and a storage medium.

BACKGROUND

High-altitude projectiles can easily cause harm to property and personnel safety, and it is difficult to determine locations at which high-altitude projectiles occur.

With the continuous development of surveillance devices, buildings can be photographed through surveillance devices. A surveillance device acquires a video of a building within a period of time by photographing the facade of the building, then the building video within the period of time is manually screened to find a video clip in the building video corresponding to a case that an object is thrown, and subsequently the video clip is judged in a manual review manner to determine a throwing position of the object.

In the related art, locations of the high-altitude projectile events are judged by manually screening camera videos of buildings, and the accuracy and efficiency of judging throwing positions are relatively low.

SUMMARY

Embodiments of the disclosure provide a throwing position acquisition method and apparatus, a computer device, and a storage medium, which can improve the accuracy and judgment efficiency of throwing position acquisition while improving the efficiency of throwing position acquisition. The technical solution is as follows:

According to an aspect, a throwing position acquisition method, performed by a computer device, may be provided, the method including: acquiring image frames of a target video, the target video being a video including a thrown target object; acquiring a projectile position in each image frame, the projectile position being a position of an image corresponding to the target object in each image frame; acquiring a trajectory starting point position of the target object based on the projectile position in each image frame, the trajectory starting point position being a starting point position of a projectile trajectory obtained based on the projectile position in each image frame; acquiring, based on projectile positions corresponding to at least one group of image frames in the image frames, a first height value corresponding to a case that the target object is thrown, the at least one group of image frames respectively including at least two image frames; and acquiring a throwing position of the target object based on the first height value and the trajectory starting point position of the target object.

According to another aspect, a throwing position acquisition apparatus, applicable to a computer device, may be provided, the apparatus including: an image frame acquisition module, configured to acquire image frames of a target video, the target video being a video including a thrown target object; a projectile position acquisition module, configured to acquire a projectile position in each image frame, the projectile position being a position of an image corresponding to the target object in each image frame; a trajectory starting point acquisition module, configured to acquire a trajectory starting point position of the target object based on the projectile position in each image frame, the trajectory starting point position being a starting point position of a projectile trajectory obtained based on the projectile position in each image frame; a first height acquisition module, configured to acquire, based on projectile positions corresponding to at least one group of image frames in the image frames, a first height value corresponding to a case that the target object is thrown, the at least one group of image frames respectively including at least two image frames; and a throwing position acquisition module, configured to acquire a throwing position of the target object based on the first height value and the trajectory starting point position of the target object.

In a possible implementation, the projectile position acquisition module includes:
  a candidate image acquisition unit, configured to acquire candidate object images in each image frame, the candidate object images being object images in a foreground image of each image frame; and
  a projectile position acquisition unit, configured to acquire the projectile positions in the image frames based on candidate positions in each image frame, the candidate positions being positions of the candidate object images in each image frame in the corresponding image frame.

In a possible implementation, the projectile position acquisition unit includes:
  a foreground image acquisition subunit, configured to acquire the foreground image in each image frame based on each image frame in the target video; and
  a threshold judgment unit, configured to acquire object images of which image areas are greater than an area threshold in the foreground image in each image frame as the candidate object images in each image frame.

In a possible implementation, the projectile position acquisition unit is configured to:
  connect, in chronological order, candidate positions between which target distances are less than a distance threshold in N consecutive image frames included in the image frames, to obtain at least one candidate trajectory, N≥2, N being an integer, and the target distance being a distance between candidate positions in two adjacent image frames sorted in chronological order in the N consecutive image frames;
  acquire a projectile trajectory of the target object in the N image frames according to the at least one candidate trajectory; and
  acquire candidate positions in the projectile trajectory of the target object in the N image frames as projectile positions in the N image frames.

In a possible implementation, the projectile position acquisition unit is further configured to:
  acquire, based on a projectile position in an $i^{th}$ image frame in the image frames and candidate positions of candidate object images in an $(i+1)^{th}$ image frame in the image frames, a projectile position in the $(i+1)^{th}$ image frame, $i \geq 1$, and i being an integer.

In a possible implementation, the projectile position acquisition unit is further configured to:
  acquire the candidate positions of the candidate object images in the $(i+1)^{th}$ image frame; and
  acquire a candidate position closest to the projectile position in the $i^{th}$ image frame in the candidate positions as the projectile position in the $(i+1)^{th}$ image frame.

In a possible implementation, the projectile position acquisition unit is further configured to:
  acquiring a candidate position corresponding to a candidate object image of which an image area is the largest in each image frame as the projectile position in each image frame.

In a possible implementation, the first height acquisition module is configured to:
  acquire the projectile positions corresponding to the at least two image frames in the at least one group of image frames and a time interval between the at least two image frames in the at least one group of image frames; and
  calculate, based on the projectile positions corresponding to the at least two image frames in the at least one group of image frames and the time interval between the at least two image frames in the at least one group of image frames, the first height value corresponding to a case that the target object is thrown.

In a possible implementation, the throwing position acquisition module includes:
  a second height acquisition unit, configured to acquire a second height value of the trajectory starting point position, the second height value being a height value of the trajectory starting point position;
  a third height acquisition unit, configured to acquire, based on the first height value and the second height value, a third height value corresponding to a case that the target object is thrown; and
  a first throwing position acquisition unit, configured to acquire the throwing position of the target object based on the third height value and a horizontal position of the trajectory starting point position.

In a possible implementation, the third height acquisition unit is configured to:
  perform weighted summation on the first height value and the second height value based on a weight parameter, to obtain the third height value corresponding to a case that the target object is thrown.

In a possible implementation, the throwing position acquisition module includes:
  a second throwing position acquisition unit, configured to acquire the throwing position of the target object based on the first height value and a horizontal position of the trajectory starting point position.

In a possible implementation, the apparatus further includes:
  a projectile trajectory acquisition module, configured to connect the projectile positions in the image frames in chronological order, to obtain the projectile trajectory of the target object; and
  a warning information generation module, configured to generate warning information in a case that the projectile trajectory of the target object meets a warning condition.

In a possible implementation, the warning condition includes:
  the projectile trajectory of the target object being a vertically downward linear trajectory; or
  the projectile trajectory of the target object being a downward parabolic trajectory.

According to still another aspect of some embodiments, a computer device may be provided, including a processor and a memory, the memory storing at least one instruction, at least one program, a code set, or an instruction set, the at least one instruction, the at least one program, the code set, or the instruction set being loaded and executed by the processor to implement the foregoing embodiments.

According to still another aspect, a non-transitory computer-readable storage medium may be provided, storing at least one instruction, at least one program, a code set, or an instruction set, the at least one instruction, the at least one program, the code set, or the instruction set being loaded and executed by a processor to implement the foregoing embodiments.

According to still another aspect, a computer program product or a computer program may be provided, the computer program product or the computer program including computer instructions, the computer instructions being stored in a computer-readable storage medium. A processor of a computer device reads the computer instructions from the computer-readable storage medium and executes the computer instructions to cause the computer device to perform the foregoing embodiments.

The technical solutions provided in the disclosure may have the following advantageous effects:

By acquiring image frames corresponding to a projectile video, and performing image processing on the image frames, a projectile position of a target object in each image frame is acquired, and a height value corresponding to a case that the target object is thrown in calculated according to at least one group of image frames in the image frames, then a throwing position of the target object is obtained with reference to a trajectory starting point position of a projectile trajectory of the target object. In the foregoing solution, the height value corresponding to a case that the target object is thrown is acquired based on at least one group of image frames in the image frames, and the throwing position of the target object is obtained according to the height value and the trajectory starting point position of the projectile trajectory, which reduces interference of external environmental factors on the acquired throwing position, and improves the accuracy of throwing position acquisition while improving the throwing position identification efficiency through the computer vision technology. In addition, in the process, influence of manual factors on the throwing position acquisition is reduced, thereby improving the efficiency of throwing position acquisition.

It is to be understood that, the foregoing general descriptions and the following detailed descriptions are merely for illustration and explanation purposes and are not intended to limit the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Figure 1:
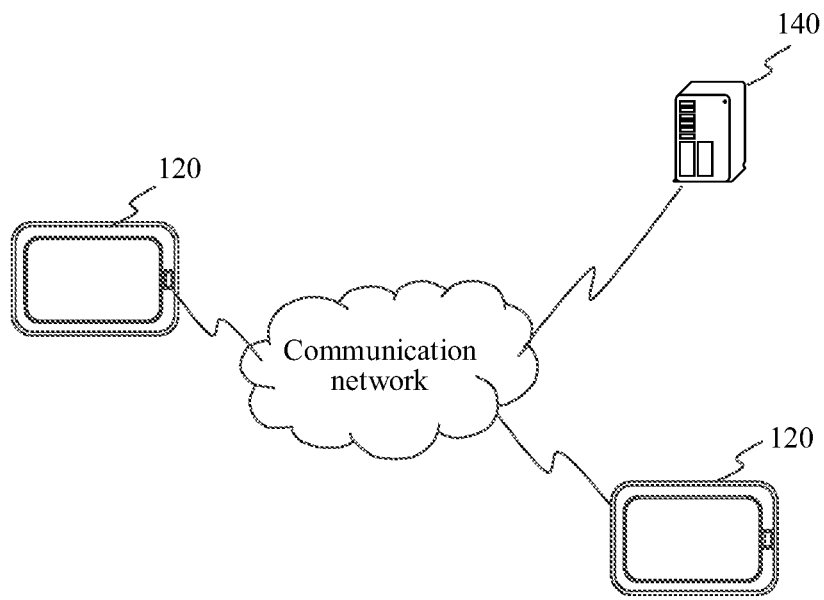
FIG. 1 is a schematic structural diagram of a throwing position acquisition system according to some embodiments.

FIG. 1 is a schematic structural diagram of a throwing position acquisition system according to some embodiments. The system includes: a video acquisition device 120 and a video processing device 140.

The video processing device 140 may be a server. The server may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

The video acquisition device 120 may be a device having a video acquisition function. For example, the video acquisition device 120 may be a camera device. Alternatively, the video acquisition device 120 may be a terminal device having an image acquisition function. For example, the terminal device may be a mobile phone, a tablet computer, a laptop, a notebook computer, a desktop computer, a smart speaker, or a smart watch, but not limited thereto.

In some embodiments, the video acquisition device 120 may send acquired video data to the video processing device 140, and the video processing device 140 performs image processing on the video data.

The video data may be video file data, or the video data may be video stream data.

The video acquisition device 120 and the video processing device 140 are connected by a communication network. The communication network may be a wired network or a wireless network.

The wireless network or the wired network uses a standard communication technology and/or protocol. The network is generally the Internet, but may be any network, including, but not limited to, any combination of a local area network (LAN), a metropolitan area network (MAN), a wide area network (WAN), a mobile, wired, or wireless network, and a dedicated network or a virtual private network. In some embodiments, technologies and/or formats such as hypertext markup language (HTML) and extensible markup language (XML) are used to represent data exchanged through a network. In addition, all or some links may be encrypted by using conventional encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

Figure 2:
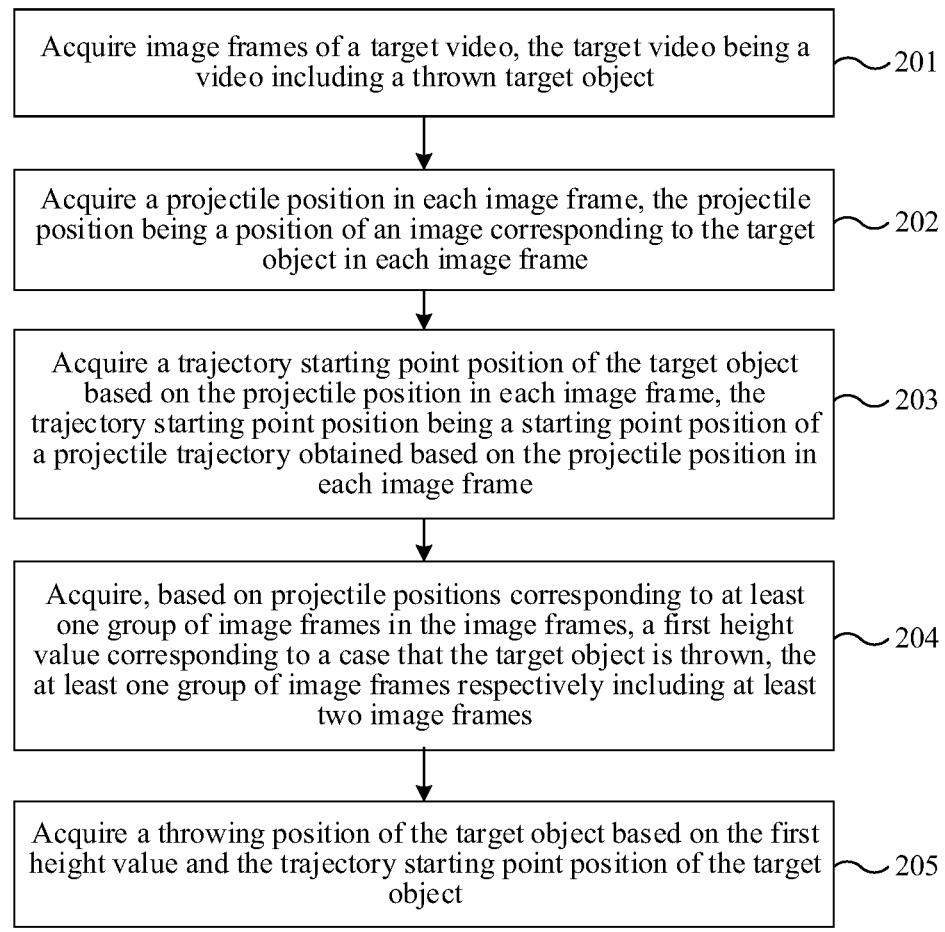
FIG. 2 is a flowchart of a throwing position acquisition method according to some embodiments.

FIG. 2 is a flowchart of a throwing position acquisition method according to some embodiments. The method may be performed by a computer device. The computer device may be a video processing device. The video processing device may be the video processing device 140 in the embodiment shown in FIG. 1. As shown in FIG. 2, the process of the throwing position acquisition method may include the following operations:

Operation 201: Acquire image frames of a target video, the target video being a video including a thrown target object.

In an example embodiment, the image frames in the target video are image frames including a process in which the target object is thrown; or, some of the image frames are image frames including a process in which the target object is thrown.

The video processing device may first process the target video to obtain image frames in the target video that include the process in which the target object is thrown; or the video processing device may directly use all the image frames of the target video as image frames in the target video on which subsequent image processing needs to be performed.

Operation 202: Acquire a projectile position in each image frame, the projectile position being a position of an image corresponding to the target object in each image frame.

The projectile position is a position obtained according to each image frame and at which the target object is located in the corresponding image frame.

Operation 203: Acquire a trajectory starting point position of the target object based on the projectile position in each image frame, the trajectory starting point position being a starting point position of a projectile trajectory obtained based on the projectile position in each image frame.

Operation 204: Acquire, based on projectile positions corresponding to at least one group of image frames in the image frames, a first height value corresponding to a case that the target object is thrown, the at least one group of image frames respectively including at least two image frames.

Operation 205: Acquire a throwing position of the target object based on the first height value and the trajectory starting point position of the target object.

Based on above, in the solution shown in this embodiment, by acquiring image frames corresponding to a projectile video, and performing image processing on the image frames, a projectile position of a target object in each image frame is acquired, and a height value corresponding to a case that the target object is thrown in calculated according to at least one group of image frames in the image frames, then a throwing position of the target object is obtained with reference to a trajectory starting point position of a projectile trajectory of the target object. In the foregoing solution, the height value corresponding to a case that the target object is thrown is acquired based on at least one group of image frames in the image frames, and the throwing position of the target object is obtained according to the height value and the trajectory starting point position of the projectile trajectory, which reduces interference of external environmental factors on the acquired throwing position, and improves the accuracy of throwing position acquisition. In addition, in the process, influence of manual factors on the throwing position acquisition is reduced, thereby improving the efficiency of throwing position acquisition.

Figure 3:
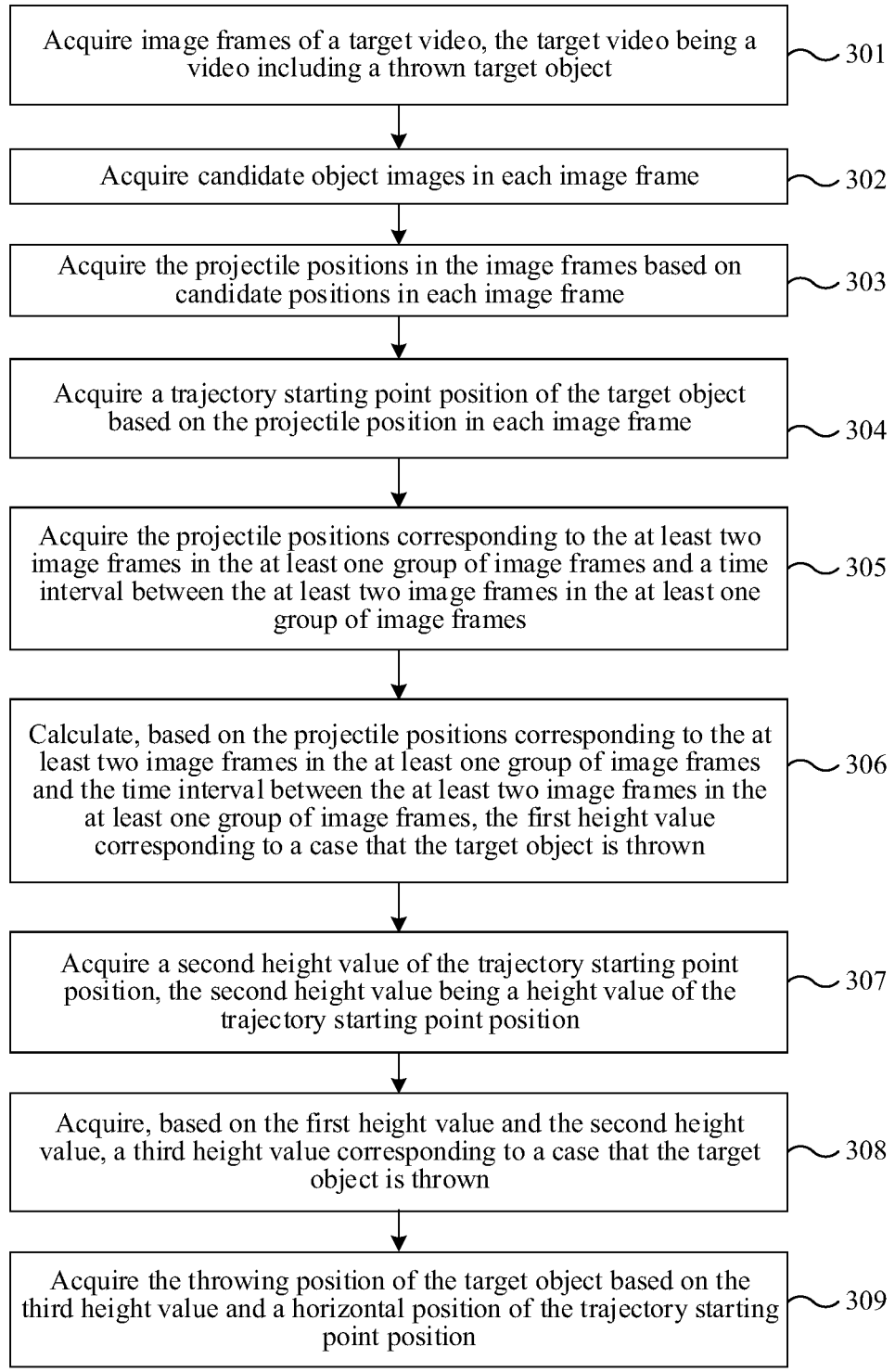
FIG. 3 is a flowchart of a throwing position acquisition method according to some embodiments.

FIG. 3 is a flowchart of a throwing position acquisition method according to some embodiments. The method may be performed by a computer device. The computer device may be a video processing device. The video processing device may be the video processing device 120 in the embodiment shown in FIG. 1. As shown in FIG. 3, the throwing position acquisition method may include the following operations:

Operation 301: Acquire image frames of a target video, the target video being a video including a thrown target object.

The image frames of the target video may be all or some of the image frames in the target video acquired by the video acquisition device based on an image capture component or a video acquisition component. After acquiring the image frames of the target video, the video acquisition device may upload the image frames of the target video to the video processing device, and correspondingly, the video processing device acquires the image frames of the target video.

The image frames may be continuous image frames in the target video.

Operation 302: Acquire candidate object images in each image frame.

There are a foreground image part and a background image part in each image frame. A foreground image is an image of an object relatively close to the video acquisition device, and a background image is an image of an object relatively far away from the video acquisition device. For example, in a high-altitude projectile scenario, the background image is usually a high-rise building, and the thrown target object usually exists in the foreground image. Therefore, the candidate object images may be object images in a foreground image of each image frame.

In an example embodiment, the background image and the foreground image corresponding to each image frame of the target video may be acquired through the background modeling technology. For example, the background image and the foreground image corresponding to each image frame of the target video may be acquired by using a visual background extractor (VIBE) algorithm.

The VIBE algorithm is a foreground detection algorithm based on background update, and the principle thereof is that: pixel values around a pixel point (x, y) and historical pixel values on the pixel point (x, y) are extracted to establish a sample set of the pixel point, then a pixel value at another frame (x, y) is compared with the pixel values in the sample set, if differences between the pixel value at the another frame (x, y) and the pixel values in the sample set are greater than a difference threshold, it is considered that the pixel point is a foreground pixel, otherwise it is considered that the pixel point is a background pixel point.

For example, when each image frame of the target video is identified by using the VIBE algorithm, pixel values of a certain pixel point in previous several frames and pixel values of pixel points around the pixel point in the image frame are acquired. Because the background image usually does not change, and there is generally no big difference between pixel points of the background image and the surrounding pixels. Therefore, when differences between a pixel value of the pixel point in another image frame and the pixel values in the sample set of the pixel point are less than the difference threshold, the pixel point in the image frame is identified as a background pixel point, and the background pixel point may be marked as 0 in a binary function. Because the foreground image is usually an image of an object that is constantly moving based on the background image, and because the foreground image blocks (replaces) some pixel points in the background image, differences between pixel points corresponding to the foreground image and surrounding pixel points corresponding to the background image are relatively large. Therefore, when differences between a pixel value on the pixel point in the image frame and pixel values in the corresponding sample set are greater than the difference threshold, the pixel point in the image frame is identified as a pixel point corresponding to the foreground image. The foreground pixel point may be marked as 1 in the binary function. Additionally, the foreground pixel point may be highlighted to distinguish it from background pixel points.

After pixel points in each image frame are identified by using the above method, each image frame may be divided into a foreground image and a background image.

In an example embodiment, the foreground image in each image frame is acquired, and the foreground image is enlarged to obtain candidate object images in each image frame.

For a surveillance video of the high-rise building acquired by the video acquisition device, images corresponding to projectile objects in the foreground images may be relatively small, which is not conducive to identification and subsequent image processing. Therefore, for the foreground image in each image frame, an image enhancement method may be used to enlarge the relatively small projectile objects in the foreground image into relatively large and easily detectable projectile objects. For example, an image expansion algorithm may be used to enlarge a relatively small projectile object in the foreground image, to obtain an image region larger than the original image of the projectile object.

In the image expansion algorithm, a template B is used to expand an image A, where the template B is a convolution template or convolution kernel, and a shape thereof may be a square or a circle; convolution calculation is performed by using the template B and the image A, each pixel point in the image is scanned, and template elements and binary image elements are used for performing an "AND" operation, if all the results are 0, a target pixel point is 0, otherwise the target pixel point is 1. Therefore, the maximum value of pixel points in a region covered by the template B is calculated, and the value is used to replace a pixel value of a reference point, to realize image expansion. That is, after convolutional computation is performed on the foreground image through the image expansion algorithm by using the template B, the field of the foreground part is expanded, that is, the boundary region of the foreground image A is expanded by using the template B, to obtain a highlighted region larger than the original image.

In an example embodiment, the candidate object images are obtained by using the connected domain algorithm.

The foreground image obtained after processing by using the foregoing background modeling technology and the image expansion algorithm is a pixmap including a binary function (0,1). In this case, candidate object images in a pixmap corresponding to the foreground image of each image frame may be screened out by using the connected domain algorithm.

The connected domain algorithm is an image segmentation method. After binarization, an image often includes a plurality of regions. For example, each image frame may include one or more highlighted regions (foreground images) marked by the pixel point 1, and the foreground image is a target image of the projectile object that needs to be screened.

One image frame is used as an example. During foreground image acquisition, the image frame may be scanned from left to right and from top to bottom. For a certain pixel point in the image frame, if the current pixel value is 0, move to the next scanning position; and if the current pixel value is 1, check its left adjacent pixel and upper adjacent pixel (the two adjacent pixels are scanned before this pixel point). By checking whether the adjacent pixels adjacent to the current pixel point are highlighted regions, whether the highlighted region with the current pixel value of 1 is a new highlighted region (foreground image) is determined. If the adjacent pixels adjacent to the current pixel point are a highlighted region, it is determined that the highlighted region with the current pixel value of 1 is not a new highlighted region; and if adjacent pixels adjacent to the current pixel point are a non-highlighted region, it is determined that the highlighted region with the current pixel value of 1 is a new highlighted region.

Therefore, a foreground image region corresponding to the candidate object images in each image frame can be obtained by using the connected domain algorithm.

Operation 303: Acquire the projectile positions in the image frames based on candidate positions in each image frame.

The candidate positions are positions of the candidate object images in each image frame in the corresponding image frame.

In an example embodiment, the foreground image in each image frame is acquired based on each image frame in the target video; and object images of which image areas are greater than an area threshold in the foreground image in each image frame are acquired as the candidate object images in each image frame.

In high-altitude projectile, more attention needs to be paid to relatively large objects, so that by screening the image areas of object images in the foreground images, more attention can be paid to the projectile process of the relatively large objects. In addition, during image processing, there may be a case in which some noise points in the image frames are misidentified as candidate object images. The noise points are usually relatively small, so that screening based on the image areas can avoid misidentification, thereby improving the efficiency of subsequent image identification.

In an example embodiment, candidate positions between which target distances are less than a distance threshold in N consecutive image frames included in the image frames are connected in chronological order, to obtain at least one candidate trajectory, N≥2, N being an integer, and the target distance being a distance between candidate positions in two adjacent image frames sorted in chronological order in the N consecutive image frames;

a projectile trajectory of the target object in the N image frames is acquired according to the at least one candidate trajectory; and candidate positions in the projectile trajectory of the target object in the N image frames are acquired as projectile positions in the N image frames.

In the process of acquiring the target video by the video acquisition device, a foreign object may intrude into the video picture, and foreign object intrusion pictures are usually continuous, which forms a continuous trajectory in the target video, for example, a flying-by bird, or clouds photographed by the video acquisition device. In the process of identifying the image frames in the target video, the foreign object may have a relatively great impact on the subsequent identification results, and due to the relatively large volume of the foreign object, the foreign object may not be identified through the image area screening, and consequently causing impacts on the image frames of the target video.

In this case, N consecutive image frames in the image frames in the target video may be selected, and the N consecutive image frames are processed, to obtain candidate object images in foreground images of the N image frames. Each candidate object image includes the target object to be detected and a possible foreign object. Considering the case of two consecutive frames, whether it is a foreign object or a target object in a projectile state, the moving distance will not be excessively long. Therefore, positions of the closest candidate object images in adjacent frames in the N consecutive image frames are connected in chronological order to obtain a candidate trajectory.

Because the moving trajectory of the foreign object is usually a horizontal straight line or a straight line close to horizontal, when there is only one candidate trajectory and the candidate trajectory is a parabolic trajectory, it can be considered that the candidate trajectory is the projectile trajectory of the target object, and positions of the candidate object images of the image frames in the candidate trajectory is the projectile positions in the image frames.

When there are two or more candidate trajectories, trajectory shapes of the candidate trajectories may be identified, and a parabolic trajectory or a straight falling trajectory may be acquired as the projectile trajectory of the target object.

In an example embodiment, a projectile position in an $(i+1)^{th}$ image frame is acquired based on a projectile position in an $i^{th}$ image frame in the image frames and candidate positions of candidate object images in the $(i+1)^{th}$ image frame in the image frames, i≥1, and i being an integer.

The image processing device may determine a projectile position in the next image frame based on a projectile position in the previous image frame.

In a possible implementation, the candidate positions of the candidate object images in the $(i+1)^{th}$ image frame in the $(i+1)^{th}$ image frame are acquired; and a candidate position closest to the projectile position in the $i^{th}$ image frame in the candidate positions is acquired as the projectile position in the $(i+1)^{th}$ image frame.

Because a moving distance of the target object in the projectile state will not be excessively long in the case of two consecutive frames, a candidate position closest to the projectile position of the target object in the previous frame in candidate positions in the next image frame may be selected as the projectile position of the target object in the next image frame; or a candidate position closest to the projectile position of the target object in the previous frame and located under the projectile position in the previous frame in the candidate positions of the next image frame may be used as the projectile position of the target object in the next image frame.

In an example embodiment, areas of the candidate object images in each image frame in the corresponding image frame are acquired; and a candidate position corresponding to candidate object image of which an image area is the largest in each image frame is acquired as the projectile position in each image frame.

Operation 304: Acquire a trajectory starting point position of the target object based on the projectile position in each image frame.

In an example embodiment, a projectile trajectory of the target object corresponding to each image frame is acquired based on the projectile position corresponding to each image frame, and a trajectory starting point position of the target object is acquired based on the projectile trajectory of the target object.

The trajectory starting point position is a starting point position corresponding to the projectile trajectory obtained based on the image frames, that is, the trajectory starting point position is a starting position corresponding to the projectile trajectory of the target object detected based on the image frames. Because in the process of performing image processing on the image frames by the image processing device, an error may be caused by interference or noise in the image frames, the trajectory starting point position obtained based on image identification may have a certain error with the real throwing position of the target object.

Operation 305: Acquire the projectile positions corresponding to the at least two image frames in the at least one group of image frames and a time interval between the at least two image frames in the at least one group of image frames.

In an example embodiment, the at least one group of image frames is at least two consecutive image frames.

The target video includes several image frames, and a time interval between two adjacent image frames may be a certain value. For example, when the target video acquired by the video acquisition device is a video in a 24-frame video format, there are 24 frames of video within 1 second of the target video, and in this case, the time interval between every two adjacent image frames is 1/24 second.

In an example embodiment, the at least one group of image frames is at least two image frames randomly extracted from the image frames of the target video.

In some embodiments, the time interval between the at least two image frames in the at least one group of image frames is greater than a time interval threshold. In other words, the at least two image frames in the at least one group of image frames are at least two image frames with a relatively long time interval, and the corresponding projectile positions in the at least two image frames are also relatively far apart.

Operation 306: Calculate, based on the projectile positions corresponding to the at least two image frames in the at least one group of image frames and the time interval between the at least two image frames in the at least one group of image frames, the first height value corresponding to a case that the target object is thrown.

When high-altitude projectile occurs in a high-rise building, it can be preliminarily considered that there are three cases: the projectile is thrown upward, the projectile is thrown horizontally, and the projectile is thrown downward:

When the projectile is thrown upward, the throwing distance will not be excessively long, and the range is probably still near the floor on which it was initially thrown. When the projectile reaches the highest point, the vertical initial velocity of falling is 0, so that it can be approximately considered that the projectile is thrown with a vertical initial velocity of 0.

When the projectile is thrown downward, cases in which the projectile is thrown downward with a relatively large force is rare, and in most cases, the initial velocity of the downward throwing is relatively low, which may be approximately 0.

When the projectile is thrown horizontally, the case is quite common. There is an initial velocity in the horizontal direction, and the initial velocity in the vertical direction is 0.

In general, because the initial velocity is relatively low in the case of a high-altitude projectile, the high-altitude projectile behavior may be approximately used as a horizontal projectile motion for analysis. Therefore, in some embodiments, the motion process of the object in the vertical direction in the horizontal projectile motion needs to be analyzed, and the high-altitude projectile model may be converted into a free fall motion model for analysis.

In some embodiments, when projectile positions corresponding to two image frames in the at least one group of image frames and a time interval between the two image frames are acquired, the first height value of the target object can be calculated.

A height difference between the projectile positions corresponding to the two image frames may be determined based on the positions of the projectile positions corresponding to the two image frames on background images. For example, when the background image is a tall building, the height difference between the projectile positions corresponding to the two image frames may be determined based on a floor difference between the projectile positions corresponding to the two image frames; or the height difference between the projectile positions corresponding to the two image frames may be determined based on a preset scale of the image in the target video and the tall building.

Figure 4:
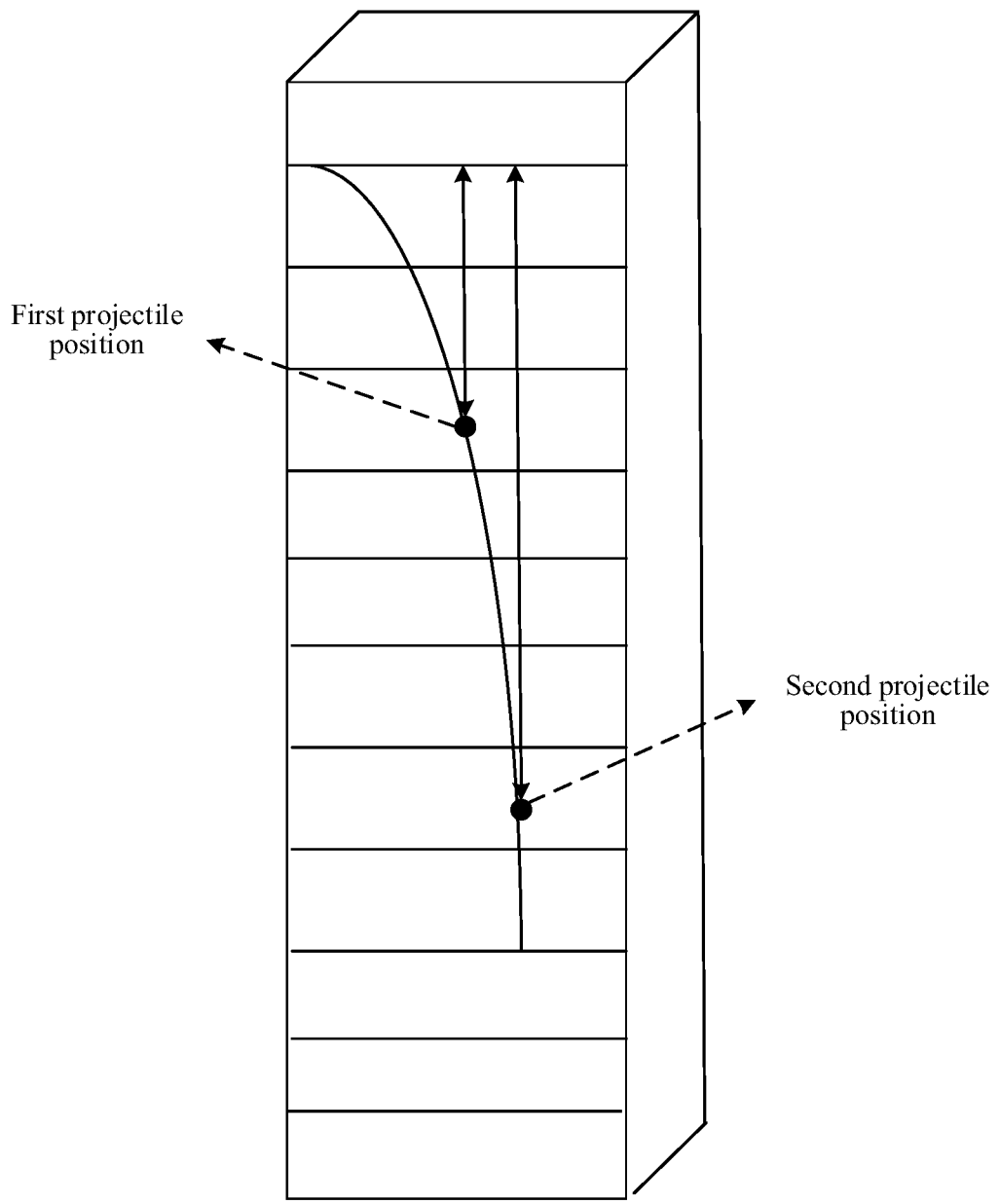
FIG. 4 is a schematic diagram of a projectile height calculating method according to the embodiment shown in FIG. 3.

FIG. 4 is a schematic diagram of a projectile height calculating method according to some embodiments. As shown in FIG. 4, a falling height corresponding to a first projectile position is $h_1$, and a falling height corresponding to a second projectile position is $h_2$, then a height difference between the first projectile position and the second projectile position is $h_1-h_2$. Because the two image frames are two image frames in the image frames corresponding to the target video, a time interval between the two image frames is known. For example, $t_1$ is a falling time corresponding to the first projectile position, and $t_2$ is a falling time corresponding to the second projectile position, then the time interval between the two image frames is $t_2-t_1$, and it can be learned from Newton's laws of motion that:

$$h_2 - h_1 = \frac{1}{2}gt_2^2 - \frac{1}{2}gt_1^2 = \frac{1}{2}g(t_2 + t_1)(t_2 - t_1)$$

where $h_2-h_1$ and $t_2-t_1$ are known, $t_2+t_1$ can be calculated, and in this way, $t_2$ and $t_1$ can be obtained, and thus $h_2$ and $h_1$ are obtained. That is, the falling height of the first projectile position and the falling height of the second projectile position can be obtained. In addition, because the first projectile position is a height value from a projectile starting point to the first projectile position, and the falling height of the second projectile position is a height value from the projectile starting point to the second projectile position, in a case that the height value of the first projectile position and the height value of the second projectile position are known, the first height value can be calculated by acquiring a time interval between the falling time corresponding to the throwing position point and the falling time corresponding to the first projectile position and a time interval between the throwing position point and the second projectile position.

In some embodiments, projectile positions corresponding to at least two image frames in the at least one group of image frames and a time interval between the at least two image frames in the at least one group of image frames are acquired, and a pre-selected height value corresponding to each group of image frames is acquired according to the projectile positions corresponding to at least two image frames in each group of image frames and a time interval between at least two image frames in each group of image frames; and mean processing is performed on the pre-selected height values corresponding to the groups of image frames, to obtain the first height value.

Operation 307: Acquire a second height value of the trajectory starting point position, the second height value being a height value of the trajectory starting point position.

In some embodiments, the second height value of the trajectory starting point position is acquired according to a correspondence between the trajectory starting point position and a background image corresponding to each image frame.

The background image corresponding to each image frame is a fixed image, so that a height value corresponding to each pixel point can be acquired according to each pixel point in the background image.

Operation 308: Acquire, based on the first height value and the second height value, a third height value corresponding to a case that the target object is thrown.

In some embodiments, weighted summation is performed on the first height value and the second height value based on a weight parameter, to obtain the third height value corresponding to a case that the target object is thrown.

In some embodiments, mean processing is performed on the first height value and the second height value of the trajectory starting point position, to obtain the third height value corresponding to a case that the target object is thrown.

Operation 309: Acquire the throwing position of the target object based on the third height value and a horizontal position of the trajectory starting point position.

In other words, the first height value corrected based on the second height value (or the second height value corrected based on the first height value), that is, the third height value, is acquired as the height value corresponding to the throwing position of the target object; and the throwing position of the target object can be located with reference to a horizontal position of the trajectory starting point position.

In some embodiments, the first height value corresponding to a case that the target object is thrown may be directly determined as the height value corresponding to the throwing position of the target object; and the throwing position of the target object is acquired based on the first height value and the horizontal position of the trajectory starting point position.

In some embodiments, the projectile positions corresponding to the image frames are connected in chronological order, to obtain the projectile trajectory of the target object; and warning information are generated in a case that the projectile trajectory of the target object meets a warning condition.

The warning condition may include: the projectile trajectory of the target object being a vertically downward linear trajectory; or the projectile trajectory of the target object being a downward parabolic trajectory.

When the image processing device detects that the projectile trajectory of the target object is a vertically downward linear trajectory, or the projectile trajectory of the target object is a downward parabolic trajectory, it means that the target object may be a relatively heavy object. In this case, warning information may be generated to remind that a relatively dangerous high-altitude projectile event has occurred.

Figure 5:
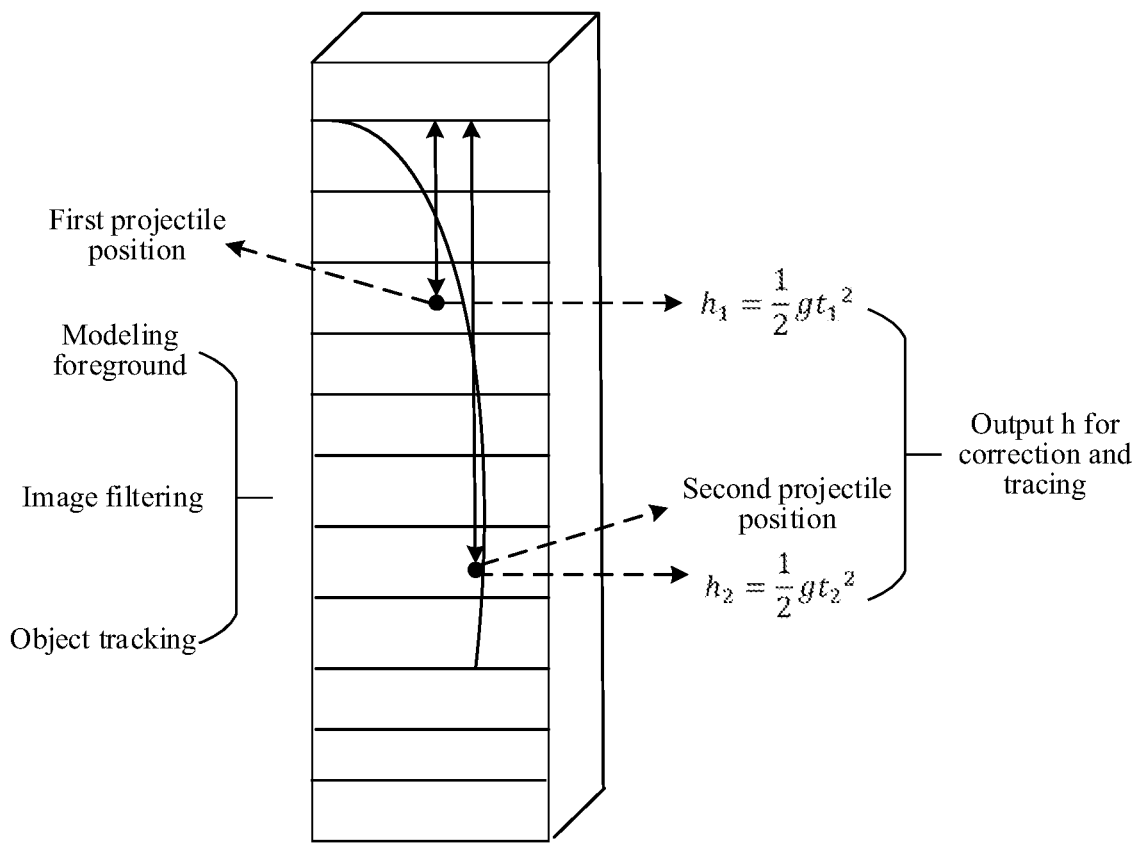
FIG. 5 is a schematic diagram of a throwing position acquisition method according to the embodiment shown in FIG. 3.

FIG. 5 is a schematic diagram of a throwing position acquisition method according to some embodiments. As shown in FIG. 5, for a high-rise building, a projectile video corresponding to the high-rise building may be acquired, and foreground image modeling (that is, acquiring the background image and the foreground image through the background modeling technology) is performed on image frames in the projectile video (target video), and then image filtering (that is, removing noise and interference through the connected domain algorithm and a screening process) is performed according to the modeled foreground image, and finally object tracking (acquisition of the projectile trajectory of the object) is implemented.

Moreover, as shown in FIG. 5, height values respectively corresponding to the first projectile position and the second projectile position can be obtained according to the first projectile position and the second projectile position in the projectile trajectory by using the free fall formula, then a first height value h of the projectile starting point is acquired, and tracing correction is performed on the projectile starting point based on the first height value h.

Figure 6:
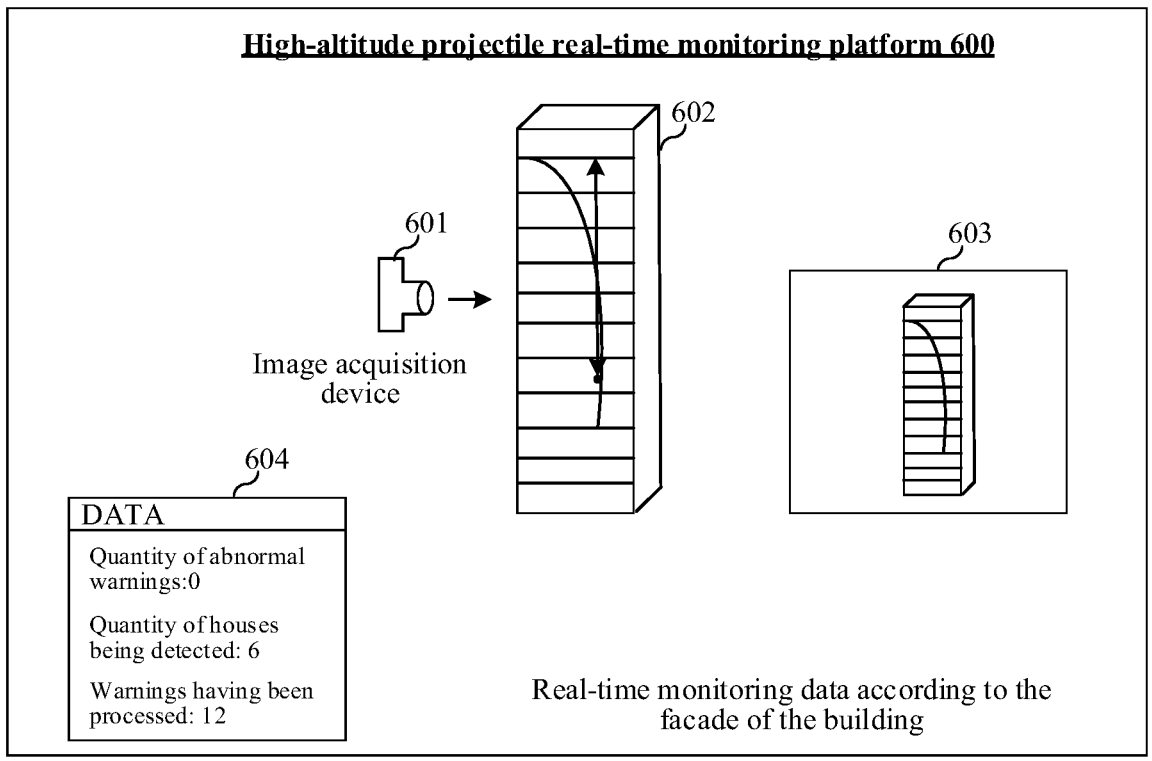
FIG. 6 is a schematic diagram of application of projectile detection according to the embodiment shown in FIG. 3.

FIG. 6 is a schematic diagram of application of projectile detection according to some embodiments. As shown in FIG. 6, the computer device may be implemented as a high-altitude projectile real-time monitoring platform. The high-altitude projectile real-time monitoring platform is a high-altitude projectile real-time monitoring system 600 established based on the cloud technology. The video acquisition device 601 of each node monitors the facade of a building 602 in real time, and transmits real-time monitoring data to the high-altitude projectile real-time monitoring platform 600 deployed on a cloud server. The high-altitude projectile real-time monitoring platform processes an image video 603 corresponding to the monitoring data by using the method shown in FIG. 5, and monitors and analyzes high-altitude projectile. When high-altitude projectile is detected, a warning module 604 in the high-altitude projectile real-time monitoring system 600 issues an alarm to the staff, so that the staff handles the high-altitude projectile event.

The system may use an ordinary camera to monitor the facade of the building in real time, perform real-time analysis by using the AI algorithm based on the real-time monitoring data of the facade of the building, to implement high-altitude projectile abnormal event monitoring on the building, provide reverse tracing to the floor interval at which the projectile occurred based on a falling velocity and distance of a thrown object in the picture, to locate the location and time point of the event, help managers to efficiently collect evidence after the event, and acquire a complete high-altitude projectile event chain. Based on the extensive monitoring range, places in a region in which projectile events easily occur can be more effectively predicted, thereby achieving rapid warning and prevention.

In addition, the system is a system for intelligent detection of high-altitude projectile based on a visual algorithm and physical tracing, in which modeling analysis is performed on video dynamic frames based on the computer vision technology, to separate background and foreground video frames (background image and foreground image), and initially locate the projectile position; and the falling process of the projectile is tracked by using the tracking algorithm, and the position of the object is located in real time with reference to the modeling algorithm. In addition, a falling velocity of the object can be calculated according to a falling time difference based on a physical model and a mathematical formula, thereby reversely tracing a falling distance of the projectile, and further correcting a falling region, to achieve the purpose of projectile monitoring and tracing. That is, background frame data and foreground frame data of the video data are firstly acquired through the background modeling technology to preliminarily locate the position of the projectile; the image enhancement method is used to increase a relatively small projectile in the picture into a relatively large and easily detectable projectile object, and the maximum connected domain algorithm is used to select the largest projectile in the picture, to filter out other relatively low image noises; the image tracking algorithm is used to track the falling process of the projectile, and the position of the projectile is located in real time with reference to the modeling algorithm; and the falling velocity of the object is calculated according to the time difference of falling based on modeling analysis and the principle of projectile motion, so as to reversely trace the fall distance of the projectile, thereby further correcting the falling region.

Even though there is already a method for processing high-altitude projectile events currently, due to the rapid urban development and the increase in high-rise buildings, high-altitude projectile events will still occur, posing a threat to public safety. However, with the installation and application of high-altitude projectile intelligent detection systems, the existing loopholes can be plugged from the source, high-altitude projectiles can be prevented, and the probability of accidents can be reduced. With the increasing prosperity of technologies such as the Internet and big data, a more livable, convenient, and safe city has become a common demand of people, and the high-altitude projectile intelligent detection system is a part of the construction of a smart city.

In addition, by using the high-altitude projectile intelligent detection system, the efficiency of community management can be improved, the risk of accidents can be reduced, and a plurality of system modules such as personnel management and vehicle management and control can be integrated in the future to achieve more refined data sharing, which not only deploys prevention for high-altitude projectile events, but also meets the upgrading needs of a smart city.

Based on above, in the solution shown in this embodiment, by acquiring image frames corresponding to a projectile video, and performing image processing on the image frames, a projectile position of a target object in each image frame is acquired, a projectile starting point position of a projectile trajectory is acquired according to the projectile position in each image frame, a height value corresponding to a case that the target object is thrown in calculated according to at least one group of image frames in the image frames, and the projectile starting point position of the projectile trajectory is updated and corrected according to the height value. In the foregoing solution, the height value corresponding to a case that the target object is thrown is acquired based on at least one group of image frames in the image frames, and the projectile trajectory starting point obtained according to image processing is updated according to the height value, to obtain a throwing position, which reduces interference of external environmental factors on the acquired throwing position, and improves the accuracy of throwing position acquisition.

Figure 7:
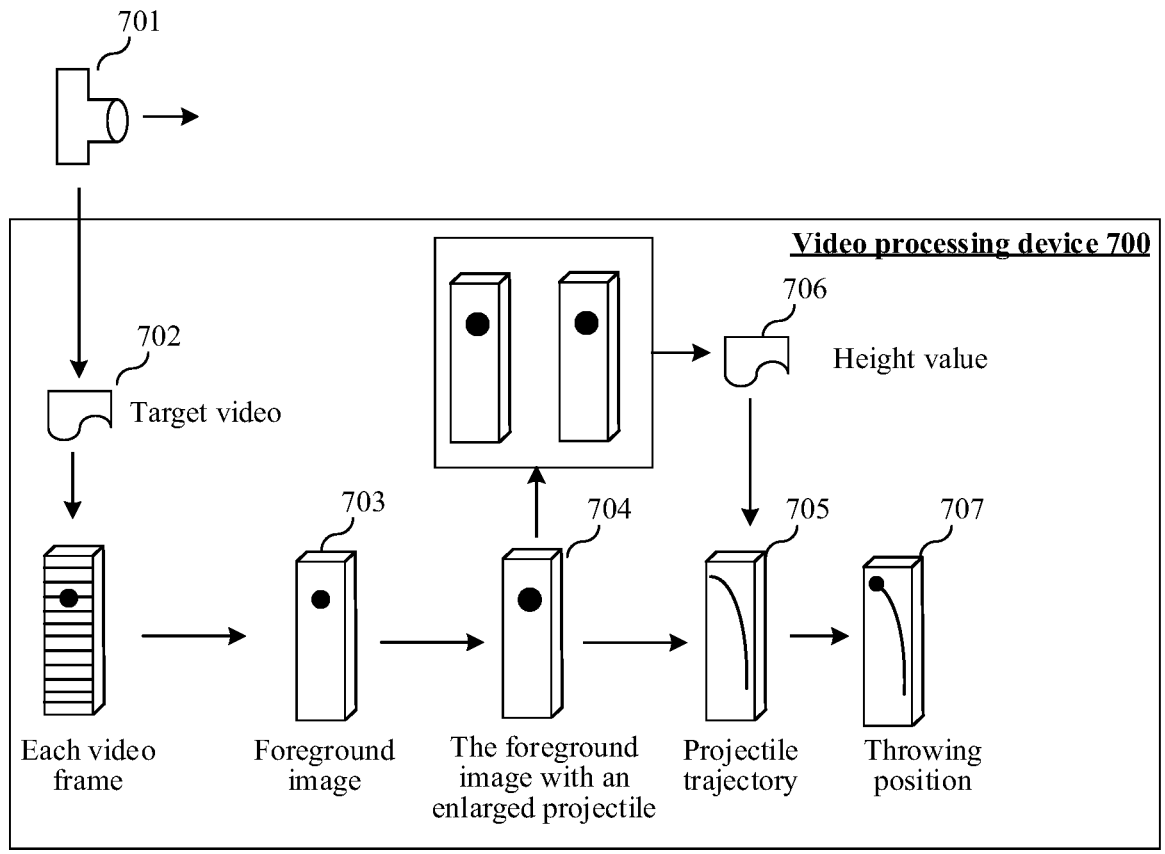
FIG. 7 is a schematic framework diagram of a throwing position acquisition method according to some embodiments.

FIG. 7 is a schematic framework diagram of a throwing position acquisition method according to some embodiments. As shown in FIG. 7:

a video acquisition device 701 monitors the facade of a building, acquires a target video 702 corresponding to high-altitude projectile of a target object, and saves and transmits the target video 702 to a video processing device 700 for high-altitude projectile detection.

The video processing device 700 acquires the target video 702, processes the target video 702 to acquire video frames corresponding to the target video 702, and then acquires a background image and a foreground image 703 of video data through the background modeling technology, to preliminary locate the position of the projectile. For example, the VIBE algorithm may be used to randomly select samples of pixels that need to be replaced through pixel-level background modeling and the foreground detection algorithm, the domain pixels are updated, and the foreground image 703 is extracted for subsequent processing.

For the extracted foreground image 703, an image enhancement method may be used to enlarge a relatively small projectile in the foreground into a relatively large and easily detectable projectile object. For example, an image expansion algorithm may be used to perform domain expansion processing on the foreground image frame, to acquire a highlighted region larger than the original image, thereby obtaining a foreground image 704 with the enlarged projectile.

A projectile trajectory of the projectile can be acquired based on the foreground image 704 with the enlarged projectile corresponding to each image frame of the target video.

For example, the maximum connected domain algorithm may be used to screen the largest projectile region in the picture, that is, the largest image may correspond to the largest connected domain. Because the largest object is usually the object to which attention needs to be paid to the projectile process, the position corresponding to the largest image may be used as the projectile position corresponding to the image frame; and a projectile trajectory 705 of the projectile may be obtained by connecting the projectile positions corresponding to the largest images corresponding to the image frames in chronological order.

Alternatively, when a foreign object appears in an image frame, the foreign object may be identified as the largest image, and the position of the foreign object is acquired as a projectile position corresponding to the image frame, resulting in that a trajectory formed through connection does not conform to a projectile trajectory. Therefore, two adjacent frames may be selected, and projectile positions identified from the previous frame of image may be compared with the relatively large candidate objects identified from this image frame. Due to a relatively short time interval between adjacent frames, a distance of the projectile between the two adjacent frames of images is not excessively large. Therefore, a position closest to the projectile position identified from the previous frame of image may be selected as the projectile position of this image frame, and projectile positions corresponding to the image frames may be connected to obtain the projectile trajectory 705 of the target object.

Alternatively, when a foreign object appears in a series of image frames, such as a bird flying over a tall building photographed in the image, the bird may be identified as the largest image through the maximum connected domain algorithm, a position corresponding to the bird in each image frame is acquired as a projectile position corresponding to the image frame, and a trajectory of the bird flying over is identified as the projectile trajectory. In this case, a plurality of consecutive image frames may be taken, images in the plurality of image frames larger than a threshold may be screened as candidate objects, and positions of candidate objects in the plurality of image frames may be connected to positions of relatively close candidate objects in adjacent image frames, to obtain at least one candidate trajectory. When there are a plurality of candidate trajectories, it means that there are a plurality of objects moving simultaneously in the image video. In this case, the candidate trajectories may be screened to acquire a trajectory meeting a projectile feature in the candidate trajectories as the projectile trajectory 705 of the target object, and positions of candidate objects corresponding to the projectile trajectory are used as projectile positions in the image frames. When it is identified that the projectile trajectory 705 is a vertically downward straight line or a downward parabola, warning information (not shown in the figure) may further be generated.

When projectile positions corresponding to the foreground images are obtained from the foreground images with the enlarged projectile by using any of the above methods, the foreground images may be grouped, and a height value (first height value) of the target object may be acquired through at least one group of foreground images (at least two images). For example, the method described in the embodiment corresponding to FIG. 3 may be used, and details are not described herein again.

The trajectory starting point of the projectile trajectory 705 is updated and corrected according to the height value 706 of the target object to obtain a throwing position 707 of the target object. Since the target video acquired by the video acquisition device is easily affected by the external environment such as light and foreign objects, there may be an error in determining the throwing position of the target object through the trajectory. Therefore, at least one group of foreground images in the foreground images may be taken, and a height value of the throwing position may be calculated based on a time difference and distance difference of foreground image photographing, and a height value of a projectile trajectory starting point position may be corrected according to the height value to obtain a throwing position of the target object, which improves accuracy of the identified projectile position. In the method provided in the embodiment shown in FIG. 7, methods such as background modeling, image enhancement, and maximum connected domain processing are effectively used to perform preliminary cleaning and screening on video data, the tracking method is also used to track and locate the projectile in real time, and finally a physical quantity of projectile falling is calculated with reference to a physical model to reversely trace the falling position of the projectile, thereby further calibrating the throwing position of the projectile, greatly improving the accuracy, and meeting the needs of rapid identification, rapid warning, and traceability of responsibility.

Figure 8:
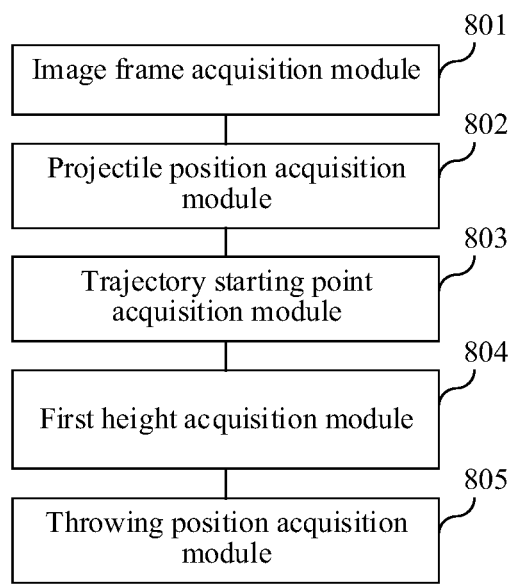
FIG. 8 is a structural block diagram of a throwing position acquisition apparatus according to some embodiments.

FIG. 8 is a structural block diagram of a throwing position acquisition apparatus according to some embodiments. In some embodiments, the throwing position acquisition apparatus provided in the embodiments of the present disclosure may be implemented in the form of a combination of software and hardware. The throwing position acquisition apparatus may implement all or some of the operations in the method provided in the embodiment shown in FIG. 2 or FIG. 3. The throwing position acquisition apparatus may include:

an image frame acquisition module 801, configured to acquire image frames of a target video, the target video being a video including a thrown target object;

a projectile position acquisition module 802, configured to acquire a projectile position in each image frame, the projectile position being a position of an image corresponding to the target object in each image frame;

a trajectory starting point acquisition module 803, configured to acquire a trajectory starting point position of the target object based on the projectile position in each image frame, the trajectory starting point position being a starting point position of a projectile trajectory obtained based on the projectile position in each image frame;

a first height acquisition module 804, configured to acquire, based on projectile positions corresponding to at least one group of image frames in the image frames, a first height value corresponding to a case that the target object is thrown, the at least one group of image frames respectively including at least two image frames; and a throwing position acquisition module 805, configured to acquire a throwing position of the target object based on the first height value and the trajectory starting point position of the target object.

In some embodiments, the projectile position acquisition module 802 may include:

a candidate image acquisition unit configured to acquire candidate object images in each image frame, the candidate object images being object images in a foreground image of each image frame; and a projectile position acquisition unit configured to acquire the projectile positions in the image frames based on candidate positions in each image frame, the candidate positions being positions of the candidate object images in each image frame in the corresponding image frame.

In some embodiments, the projectile position acquisition unit may include:

a foreground image acquisition subunit configured to acquire the foreground image in each image frame based on each image frame in the target video; and a threshold judgment unit configured to acquire object images of which image areas are greater than an area threshold in the foreground image in each image frame as the candidate object images in each image frame.

In some embodiments, the projectile position acquisition unit may be configured to:
  connect, in chronological order, candidate positions between which target distances are less than a distance threshold in N consecutive image frames included in the image frames, to obtain at least one candidate trajectory, N≥2, N being an integer, and the target distance being a distance between candidate positions in two adjacent image frames sorted in chronological order in the N consecutive image frames;
  acquire a projectile trajectory of the target object in the N image frames according to the at least one candidate trajectory; and
  acquire candidate positions in the projectile trajectory of the target object in the N image frames as projectile positions in the N image frames.

In some embodiments, the projectile position acquisition unit may be further configured to:
  acquire, based on a projectile position in an $i^{th}$ image frame in the image frames and candidate positions of candidate object images in an $(i+1)^{th}$ image frame in the image frames, a projectile position in the $(i+1)^{th}$ image frame, i≥1, and i being an integer.

In some embodiments, the projectile position acquisition unit may be further configured to:
  acquire the candidate positions of the candidate object images in the $(i+1)^{th}$ image frame; and
  acquire a candidate position closest to the projectile position in the $i^{th}$ image frame in the candidate positions as the projectile position in the $(i+1)^{th}$ image frame.

In some embodiments, the projectile position acquisition unit may be further configured to:
  acquire a candidate position corresponding to a candidate object image of which an image area is the largest in each image frame as the projectile position in each image frame.

In some embodiments, the first height acquisition module 804 may be configured to:
  acquire the projectile positions corresponding to the at least two image frames in the at least one group of image frames and a time interval between the at least two image frames in the at least one group of image frames; and
  calculate, based on the projectile positions corresponding to the at least two image frames in the at least one group of image frames and the time interval between the at least two image frames in the at least one group of image frames, the first height value corresponding to a case that the target object is thrown.

In some embodiments, the throwing position acquisition module 805 may include:
  a second height acquisition unit, configured to acquire a second height value of the trajectory starting point position, the second height value being a height value of the trajectory starting point position;
  a third height acquisition unit, configured to acquire, based on the first height value and the second height value, a third height value corresponding to a case that the target object is thrown; and
  a first throwing position acquisition unit, configured to acquire the throwing position of the target object based on the third height value and a horizontal position of the trajectory starting point position.

In some embodiments, the third height acquisition unit may be configured to:
  perform weighted summation on the first height value and the second height value based on a weight parameter, to obtain the third height value corresponding to a case that the target object is thrown.

In some embodiments, the throwing position acquisition module may include:
  a second throwing position acquisition unit, configured to acquire the throwing position of the target object based on the first height value and a horizontal position of the trajectory starting point position.

In some embodiments, the apparatus may further include:
  a projectile trajectory acquisition module, configured to connect the projectile positions in the image frames in chronological order, to obtain the projectile trajectory of the target object; and
  a warning information generation module, configured to generate warning information in a case that the projectile trajectory of the target object meets a warning condition.

In some embodiments, the warning condition may include:
  the projectile trajectory of the target object being a vertically downward linear trajectory; or
  the projectile trajectory of the target object being a downward parabolic trajectory.

Based on above, by using the throwing position acquisition apparatus provided in the embodiments, by acquiring image frames corresponding to a projectile video, and performing image processing on the image frames, a projectile position of a target object in each image frame is acquired, and a height value corresponding to a case that the target object is thrown in calculated according to at least one group of image frames in the image frames, then a throwing position of the target object is obtained with reference to a trajectory starting point position of a projectile trajectory of the target object. In the foregoing solution, the height value corresponding to a case that the target object is thrown is acquired based on at least one group of image frames in the image frames, and the throwing position of the target object is obtained according to the height value and the trajectory starting point position of the projectile trajectory, which reduces interference of external environmental factors on the acquired throwing position, and improves the accuracy of throwing position acquisition. In addition, in the process, influence of manual factors on the throwing position acquisition is reduced, thereby improving the efficiency of throwing position acquisition.

A person of ordinary skill would understand that these "modules" or "units" in the foregoing embodiments could be implemented by hardware logic, computer software code, or a combination of both.

Figure 9:
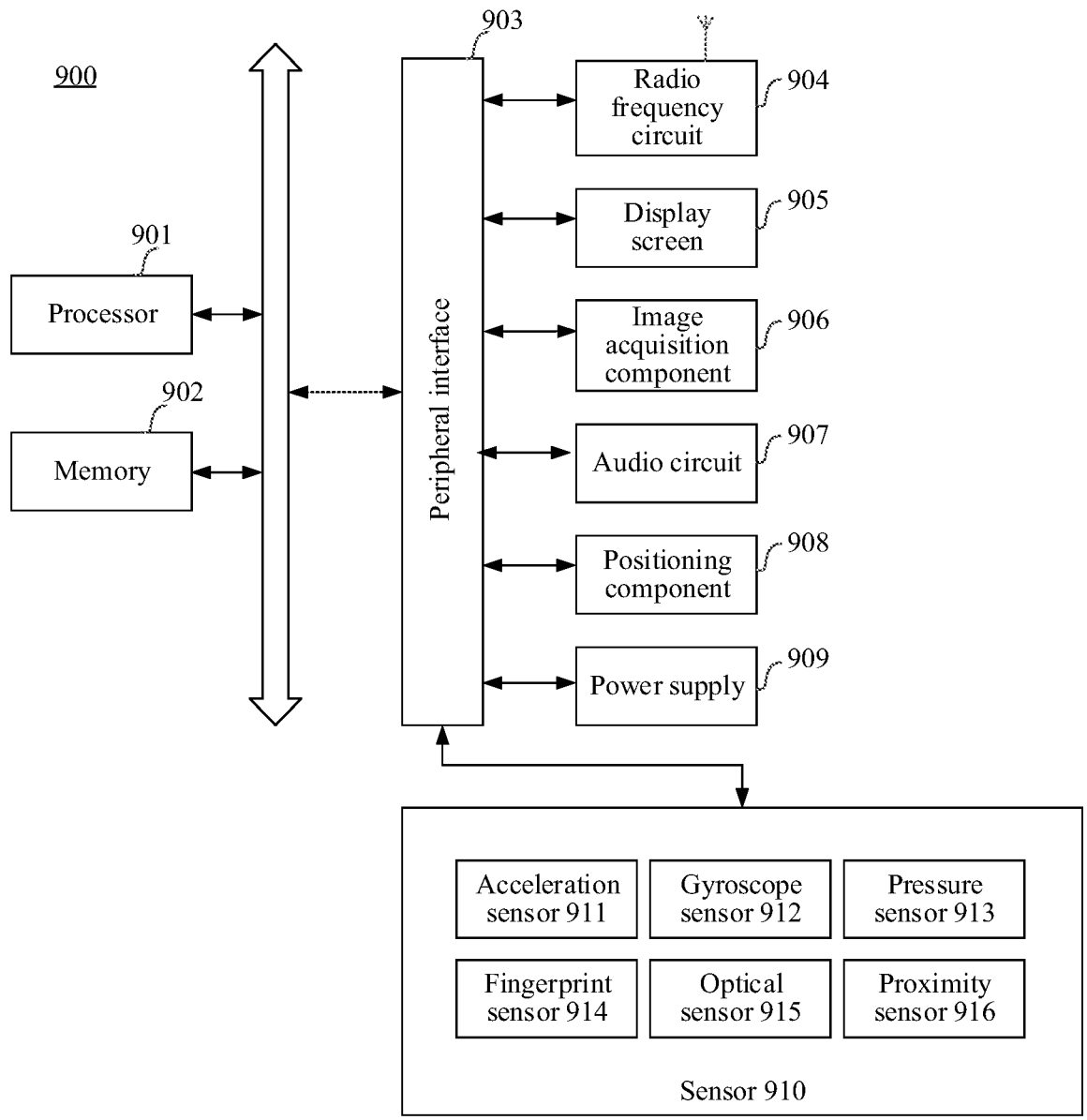
FIG. 9 is a structural block diagram of a computer device according to some embodiments.

FIG. 9 is a structural block diagram of a computer device 900 according to some embodiments. The computer device 900 may be the video acquisition device in the system shown in FIG. 1.

Generally, the computer device 900 includes a processor 901 and a memory 902.

The processor 901 may include one or more processing cores, for example, a 4-core processor or an 8-core processor. The processor 901 may be implemented by using at least one hardware form of digital signal processing (DSP), a field-programmable gate array (FPGA), and a programmable logic array (PLA). The processor 901 may also include a main processor and a coprocessor. In some embodiments, the processor 901 may be integrated with a graphics processing unit (GPU). The processor 901 may further include an artificial intelligence (AI) processor. The AI processor is configured to process a computing operation related to machine learning.

The memory 902 may include one or more computer-readable storage media. The computer-readable storage medium may be non-transient. The memory 902 may further include a high-speed random access memory (RAM), and a non-volatile memory such as one or more magnetic disk storage devices and a flash storage device. In some embodiments, the non-transitory computer-readable storage medium in the memory 902 is configured to store at least one instruction, the at least one instruction being executed by the processor 901 to implement all or some of the operations in the foregoing method embodiments.

In some embodiments, when the computer device is implemented as a video acquisition device, the computer device 900 may further include a peripheral interface 903 and at least one peripheral. The processor 901, the memory 902, and the peripheral interface 903 may be connected to each other by a bus or a signal cable. Each peripheral may be connected to the peripheral interface 903 by a bus, a signal cable, or a circuit board. The peripheral may include: at least one of a radio frequency (RF) circuit 904, a display screen 905, a camera component 906, an audio circuit 907, a positioning component 908, and a power supply 909.

In some embodiments, the computer device 900 further includes one or more sensors 910. The one or more sensors 910 include, but not limited to, an acceleration sensor 911, a gyroscope sensor 912, a pressure sensor 913, a fingerprint sensor 914, an optical sensor 915, and a proximity sensor 916.

A person skilled in the art may understand that the structure shown in FIG. 9 does not constitute any limitation on the computer device 900, and the computer device may include more or fewer components than those shown in the figure, or some components may be combined, or a different component deployment may be used.

Figure 10:
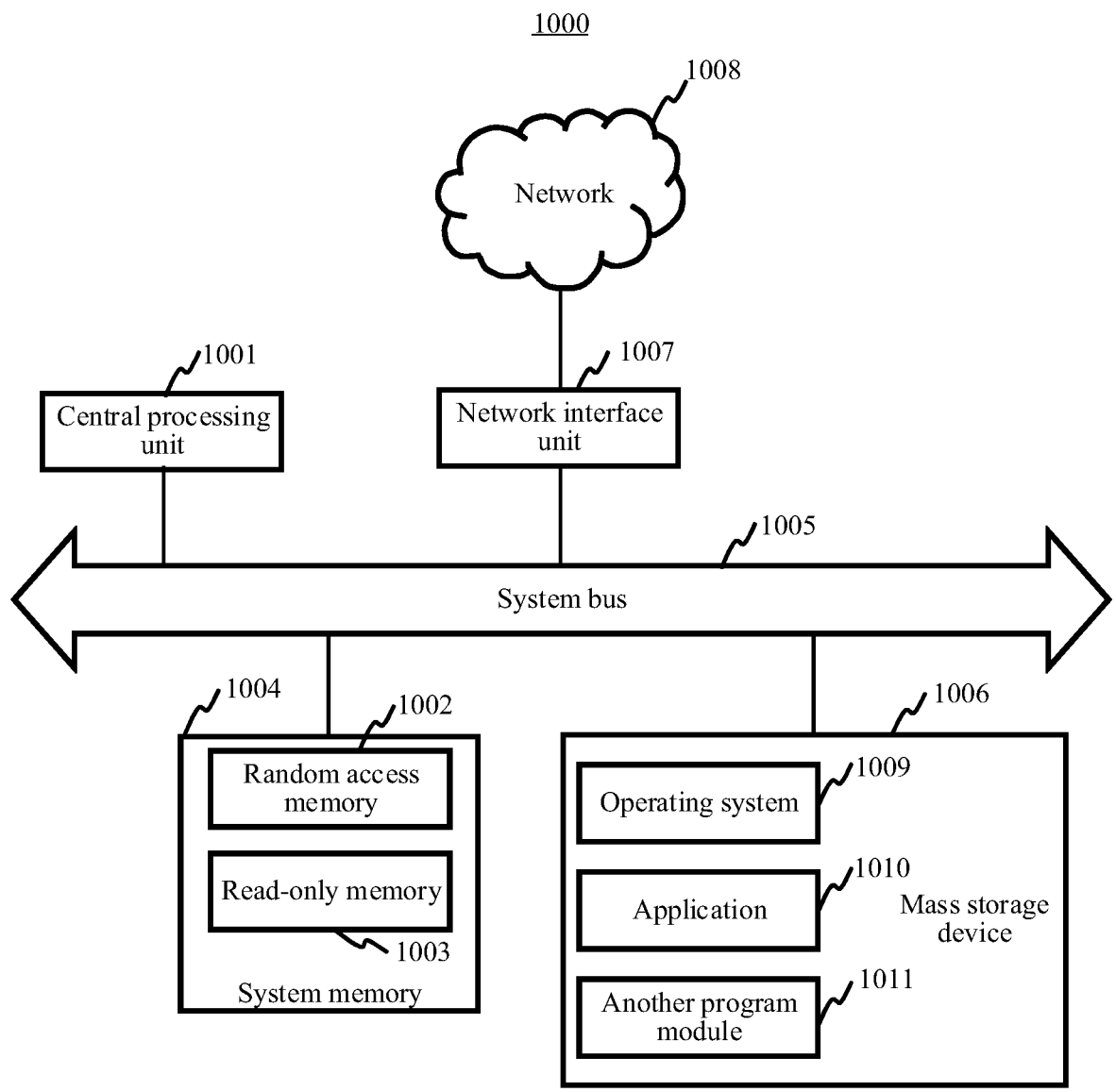
FIG. 10 is a structural block diagram of a computer device according to some embodiments.

FIG. 10 is a structural block diagram of a computer device 1000 according to some embodiments. The computer device may be implemented as the video processing device in the foregoing solution. The computer device 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The computer device 1000 further includes a mass storage device 1006 configured to store an operating system 1009, an application 1010, and another program module 1011.

The mass storage device 1006 is connected to the CPU 1001 by a mass storage controller (not shown) connected to the system bus 1005. The mass storage device 1006 and an associated computer-readable medium provide non-volatile storage for the computer device 1000. That is, the mass storage device 1006 may include a computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may know that the computer storage medium is not limited to the foregoing types. The system memory 1004 and the mass storage device 1006 may be collectively referred to as a memory.

According to some embodiments, the computer device 1000 may be further connected, through a network such as the Internet, to a remote computer on the network, and run. That is, the computer device 1000 may be connected to a network 1008 by a network interface unit 1007 connected to the system bus 1005, or may be connected to another type of network or a remote computer system (not shown) by a network interface unit 1007.

The memory may further include at least one instruction, at least one program, a code set, or an instruction set, the at least one instruction, the at least one program, the code set, or the instruction set being stored in the memory. The CPU 1001 executes the at least one instruction, the at least one program, the code set, or the instruction set to implement all or some of the operations in the throwing position acquisition method shown in the foregoing embodiments.

In some embodiments, a non-transitory computer-readable storage medium including instructions, for example, a memory including a computer program (instructions), is further provided, and the program (the instructions) may be executed by a processor of a computer device to complete the methods shown in the embodiments. For example, the non-transitory computer-readable storage medium may be a ROM, a RAM, a compact disc read-only memory (CD-ROM), a magnetic tape, a floppy disk, an optical data storage device, and the like.

In some embodiments, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method shown in the foregoing embodiments.

After considering the specification and practicing the present disclosure, a person skilled in the art may easily conceive of other implementations of the disclosure. The disclosure is intended to cover any variations, uses or adaptation of the disclosure following the general principles of the disclosure, and includes the well-known knowledge and conventional technical means in the art and undisclosed in the disclosure. The specification and the embodiments are merely considered as examples, and the actual scope and the spirit of the disclosure are stated in the claims.

It is to be understood that the disclosure is not limited to the precise structures described above and shown in the accompanying drawings, and various modifications and changes can be made without departing from the scope of the disclosure. The scope is subject only to the appended claims.

What is claimed is:

1. A throwing position acquisition method, performed by a computer device, the throwing position acquisition method comprising:

acquiring image frames of a target video, the target video being a video comprising a thrown target object;

acquiring a projectile position in each image frame, the projectile position being a position of an image corresponding to the target object in each image frame;

acquiring a trajectory starting point position of the target object based on the projectile position in each image frame, the trajectory starting point position being a starting point position of a projectile trajectory obtained based on the projectile position in each image frame;

acquiring, based on projectile positions corresponding to at least one group of image frames in the image frames, a first height value corresponding to a case that the target object is thrown, the at least one group of image frames respectively comprising at least two image frames; and acquiring a throwing position of the target object based on the first height value and the trajectory starting point position of the target object.

2. The throwing position acquisition method according to claim 1, wherein the acquiring a projectile position in each image frame comprises:

acquiring candidate object images in each image frame, the candidate object images being object images in a foreground image of each image frame; and acquiring the projectile positions in the image frames based on candidate positions in each image frame, the candidate positions being positions of the candidate object images in each image frame in the corresponding image frame.

3. The throwing position acquisition method according to claim 2, wherein the acquiring candidate object images in each image frame comprises:

acquiring the foreground image in each image frame based on each image frame in the target video; and acquiring object images of which image areas are greater than an area threshold in the foreground image in each image frame as the candidate object images in each image frame.

4. The throwing position acquisition method according to claim 2, wherein the acquiring the projectile positions in the image frames based on candidate positions in each image frame comprises:

connecting, in chronological order, candidate positions between which target distances are less than a distance threshold in N consecutive image frames comprised in the image frames, to obtain at least one candidate trajectory, N≥2, N being an integer, and the target distance being a distance between candidate positions in two adjacent image frames sorted in chronological order in the N consecutive image frames;

acquiring a projectile trajectory of the target object in the N image frames according to the at least one candidate trajectory; and acquiring candidate positions in the projectile trajectory of the target object in the N image frames as projectile positions in the N image frames.

5. The throwing position acquisition method according to claim 2, wherein the acquiring the projectile positions in the image frames based on candidate positions in each image frame comprises:

acquiring, based on a projectile position in an $i^{th}$ image frame in the image frames and candidate positions of candidate object images in an $(i+1)^{th}$ image frame in the image frames, a projectile position in the $(i+1)^{th}$ image frame, i≥1, and i being an integer.

6. The throwing position acquisition method according to claim 5, wherein the acquiring, based on a projectile position in an $i^{th}$ image frame in the image frames and candidate positions of candidate object images in an $(i+1)^{th}$ image frame in the image frames, a projectile position in the $(i+1)^{th}$ image frame comprises:

acquiring the candidate positions of the candidate object images in the $(i+1)^{th}$ image frame; and acquiring a candidate position closest to the projectile position in the $i^{th}$ image frame in the candidate positions as the projectile position in the $(i+1)^{th}$ image frame.

7. The throwing position acquisition method according to claim 3, wherein the acquiring the projectile positions in the image frames based on candidate positions in each image frame comprises:

acquiring a candidate position corresponding to a candidate object image of which an image area is the largest in each image frame as the projectile position in each image frame.

8. The throwing position acquisition method according to claim 1, wherein the acquiring, based on projectile positions corresponding to at least one group of image frames in the image frames, a first height value corresponding to a case that the target object is thrown comprises:

acquiring the projectile positions corresponding to the at least two image frames in the at least one group of image frames and a time interval between the at least two image frames in the at least one group of image frames; and calculating, based on the projectile positions corresponding to the at least two image frames in the at least one group of image frames and the time interval between the at least two image frames in the at least one group of image frames, the first height value corresponding to a case that the target object is thrown.

9. The throwing position acquisition method according to claim 1, wherein the acquiring a throwing position of the target object based on the first height value and the trajectory starting point position of the target object comprises:

acquiring a second height value of the trajectory starting point position, the second height value being a height value of the trajectory starting point position;

acquiring, based on the first height value and the second height value, a third height value corresponding to a case that the target object is thrown; and acquiring the throwing position of the target object based on the third height value and a horizontal position of the trajectory starting point position.

10. The throwing position acquisition method according to claim 9, wherein the acquiring, based on the first height value and the second height value, a third height value corresponding to a case that the target object is thrown comprises:

performing weighted summation on the first height value and the second height value based on a weight parameter, to obtain the third height value corresponding to a case that the target object is thrown.

11. The throwing position acquisition method according to claim 1, wherein the acquiring a throwing position of the target object based on the first height value and the trajectory starting point position of the target object comprises:

acquiring the throwing position of the target object based on the first height value and a horizontal position of the trajectory starting point position.

12. The throwing position acquisition method according to claim 1, further comprising:

connecting the projectile positions in the image frames in chronological order, to obtain the projectile trajectory of the target object; and generating warning information in a case that the projectile trajectory of the target object meets a warning condition.

13. The throwing position acquisition method according to claim 12, wherein the warning condition comprises:
the projectile trajectory of the target object being a vertically downward linear trajectory; or
the projectile trajectory of the target object being a downward parabolic trajectory.

14. A throwing position acquisition apparatus, comprising:
at least one memory configured to store program code; and
at least one processor configured to read the program code and operate as instructed by the program code, the program code comprising:
image frame acquisition code configured to cause the at least one processor to acquire image frames of a target video, the target video being a video comprising a thrown target object;
projectile position acquisition code configured to acquire a projectile position in each image frame, the projectile position being a position of an image corresponding to the target object in each image frame;
trajectory starting point acquisition code configured to cause the at least one processor to acquire a trajectory starting point position of the target object based on the projectile position in each image frame, the trajectory starting point position being a starting point position of a projectile trajectory obtained based on the projectile position in each image frame;
first height acquisition code configured to cause the at least one processor to acquire, based on projectile positions corresponding to at least one group of image frames in the image frames, a first height value corresponding to a case that the target object is thrown, the at least one group of image frames respectively comprising at least two image frames; and
throwing position acquisition code configured to cause the at least one processor to acquire a throwing position of the target object based on the first height value and the trajectory starting point position of the target object.

15. The throwing position acquisition apparatus according to claim 14, wherein the projectile position acquisition code comprises:
candidate image acquisition subcode configured to cause the at least one processor to acquire candidate object images in each image frame, the candidate object images being object images in a foreground image of each image frame; and
projectile position acquisition subcode configured to cause the at least one processor to acquire the projectile positions in the image frames based on candidate positions in each image frame, the candidate positions being positions of the candidate object images in each image frame in the corresponding image frame.

16. The throwing position acquisition apparatus according to claim 15, wherein the projectile position acquisition code comprises:
foreground image acquisition subcode configured to cause the at least one processor to acquire the foreground image in each image frame based on each image frame in the target video; and
threshold judgment subcode configured to cause the at least one processor to acquire object images of which image areas are greater than an area threshold in the foreground image in each image frame as the candidate object images in each image frame.

17. The throwing position acquisition apparatus according to claim 14, wherein the projectile position acquisition code is further configured to cause the at least one processor to:
connect, in chronological order, candidate positions between which target distances are less than a distance threshold in N consecutive image frames comprised in the image frames, to obtain at least one candidate trajectory, N≥2, N being an integer, and the target distance being a distance between candidate positions in two adjacent image frames sorted in chronological order in the N consecutive image frames;
acquire a projectile trajectory of the target object in the N image frames according to the at least one candidate trajectory; and
acquire candidate positions in the projectile trajectory of the target object in the N image frames as projectile positions in the N image frames.

18. A non-transitory computer-readable storage medium, storing computer code that when executed by at least one processor causes the at least one processor to:
acquire image frames of a target video, the target video being a video comprising a thrown target object;
acquire a projectile position in each image frame, the projectile position being a position of an image corresponding to the target object in each image frame;
acquire a trajectory starting point position of the target object based on the projectile position in each image frame, the trajectory starting point position being a starting point position of a projectile trajectory obtained based on the projectile position in each image frame;
acquire, based on projectile positions corresponding to at least one group of image frames in the image frames, a first height value corresponding to a case that the target object is thrown, the at least one group of image frames respectively comprising at least two image frames; and
acquire a throwing position of the target object based on the first height value and the trajectory starting point position of the target object.

19. The non-transitory computer-readable storage medium according to claim 18, wherein the acquire a projectile position in each image frame comprises:
acquiring candidate object images in each image frame, the candidate object images being object images in a foreground image of each image frame; and
acquiring the projectile positions in the image frames based on candidate positions in each image frame, the candidate positions being positions of the candidate object images in each image frame in the corresponding image frame.

20. The non-transitory computer-readable storage medium according to claim 19, wherein the acquiring candidate object images in each image frame comprises:
acquiring the foreground image in each image frame based on each image frame in the target video; and
acquiring object images of which image areas are greater than an area threshold in the foreground image in each image frame as the candidate object images in each image frame.

* * * * *